(12) United States Patent
Vajravel et al.

(10) Patent No.: US 11,068,613 B2
(45) Date of Patent: Jul. 20, 2021

(54) DIFFERENTIATING AND MANAGING IDENTICAL USB DEVICES

(71) Applicant: Dell Products L.P., Round Rock, TX (US)

(72) Inventors: Gokul Thiruchengode Vajravel, Rayasandra Bengaluru (IN); Jenin Johnsimon, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 613 days.

(21) Appl. No.: 16/057,684

(22) Filed: Aug. 7, 2018

(65) Prior Publication Data

US 2020/0050781 A1 Feb. 13, 2020

(51) Int. Cl.
*G06F 21/62* (2013.01)
*G06F 13/42* (2006.01)
*G06F 13/10* (2006.01)

(52) U.S. Cl.
CPC ........ *G06F 21/6218* (2013.01); *G06F 13/102* (2013.01); *G06F 13/4282* (2013.01); *G06F 2213/0042* (2013.01)

(58) Field of Classification Search
CPC ......... G06F 2221/6218; G06F 2221/73; G06F 2221/85; G06F 2221/2141; G06F 13/102; G06F 13/4282; G06F 2213/0042
See application file for complete search history.

(56) References Cited

U.S. PATENT DOCUMENTS

2016/0321195 A1* 11/2016 Ghosh .................... G06F 13/102
2018/0212817 A1*  7/2018 Vajravel ................. G06F 13/385
2018/0270194 A1*  9/2018 Beitler .................... G06F 13/385
2019/0042805 A1*  2/2019 Desai ....................... G06F 21/44

* cited by examiner

*Primary Examiner* — Minh Dinh
(74) *Attorney, Agent, or Firm* — Kirton McConkie; Brian Tucker

(57) ABSTRACT

Identical USB devices can be differentiated and managed. During enumeration, a filter driver can be loaded on the device stack of any USB device to enable it to selectively allow or block the particular USB device based on a unique identifier of the USB device. The filter driver can obtain this unique identifier of the particular USB device and compare it to an applicable policy to determine whether the particular USB device is allowed. If the policy indicates that a USB device having the unique identifier should be blocked, the filter driver can stop the enumeration process so that the USB device cannot be accessed.

20 Claims, 19 Drawing Sheets

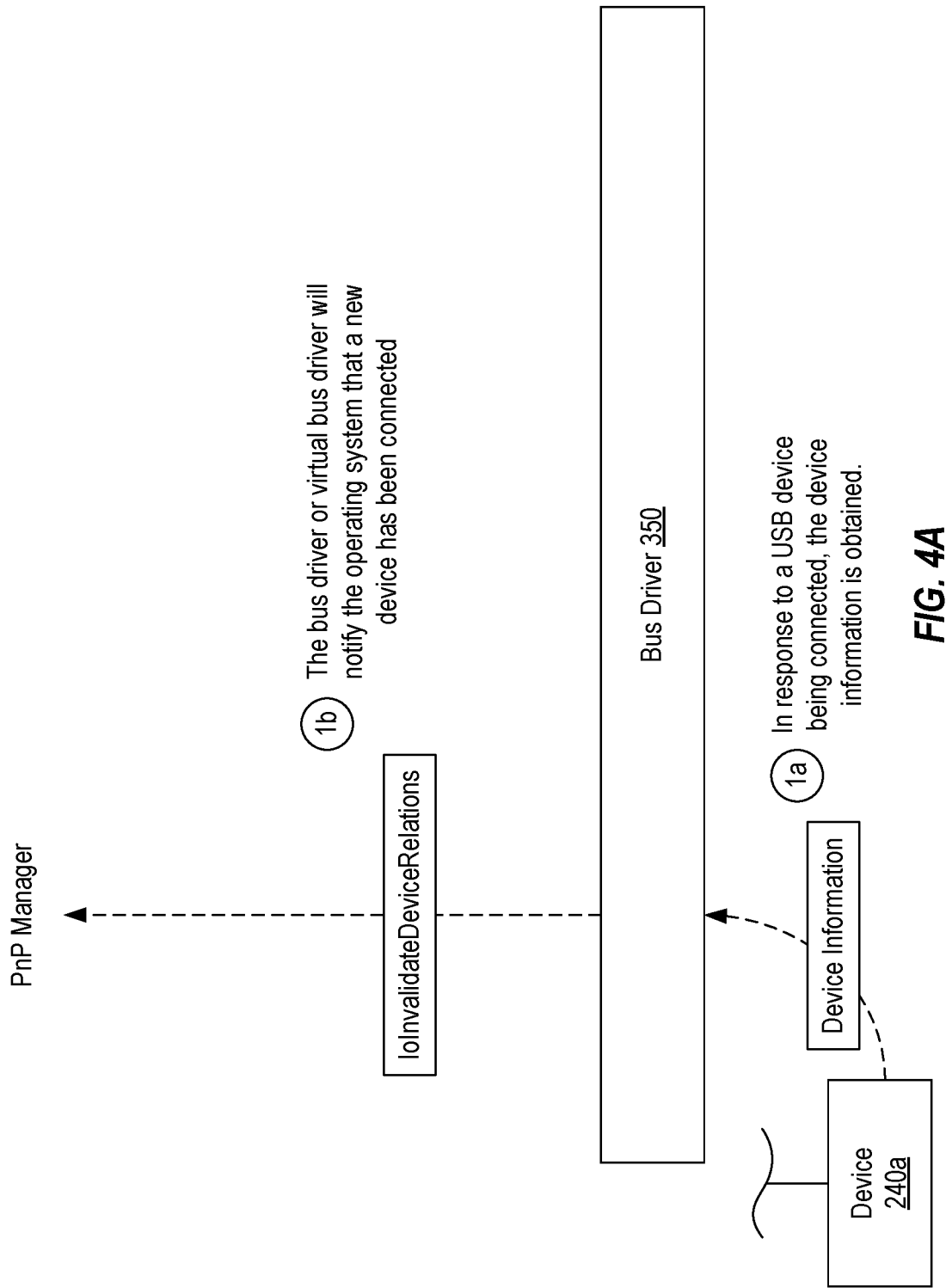

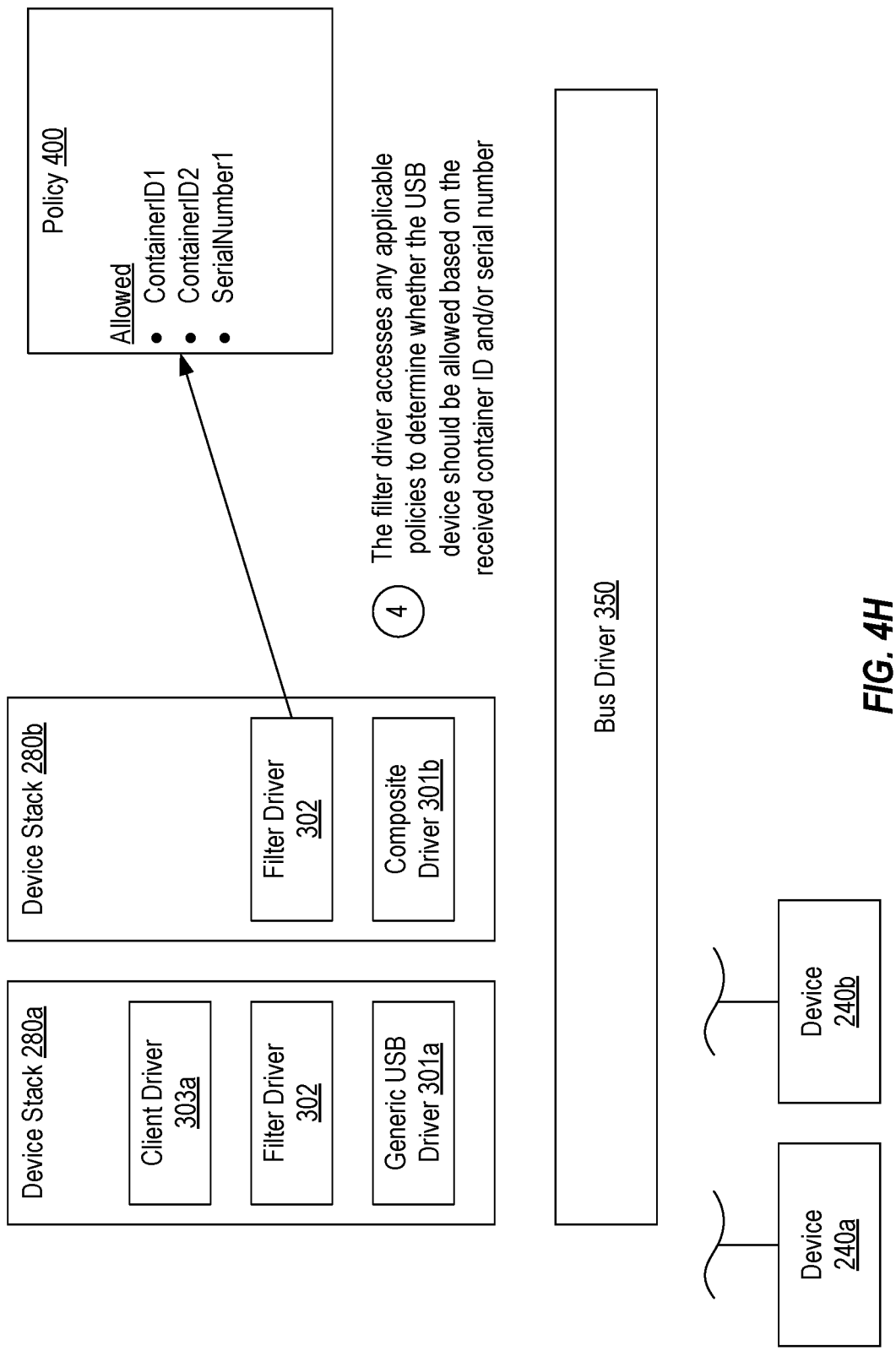

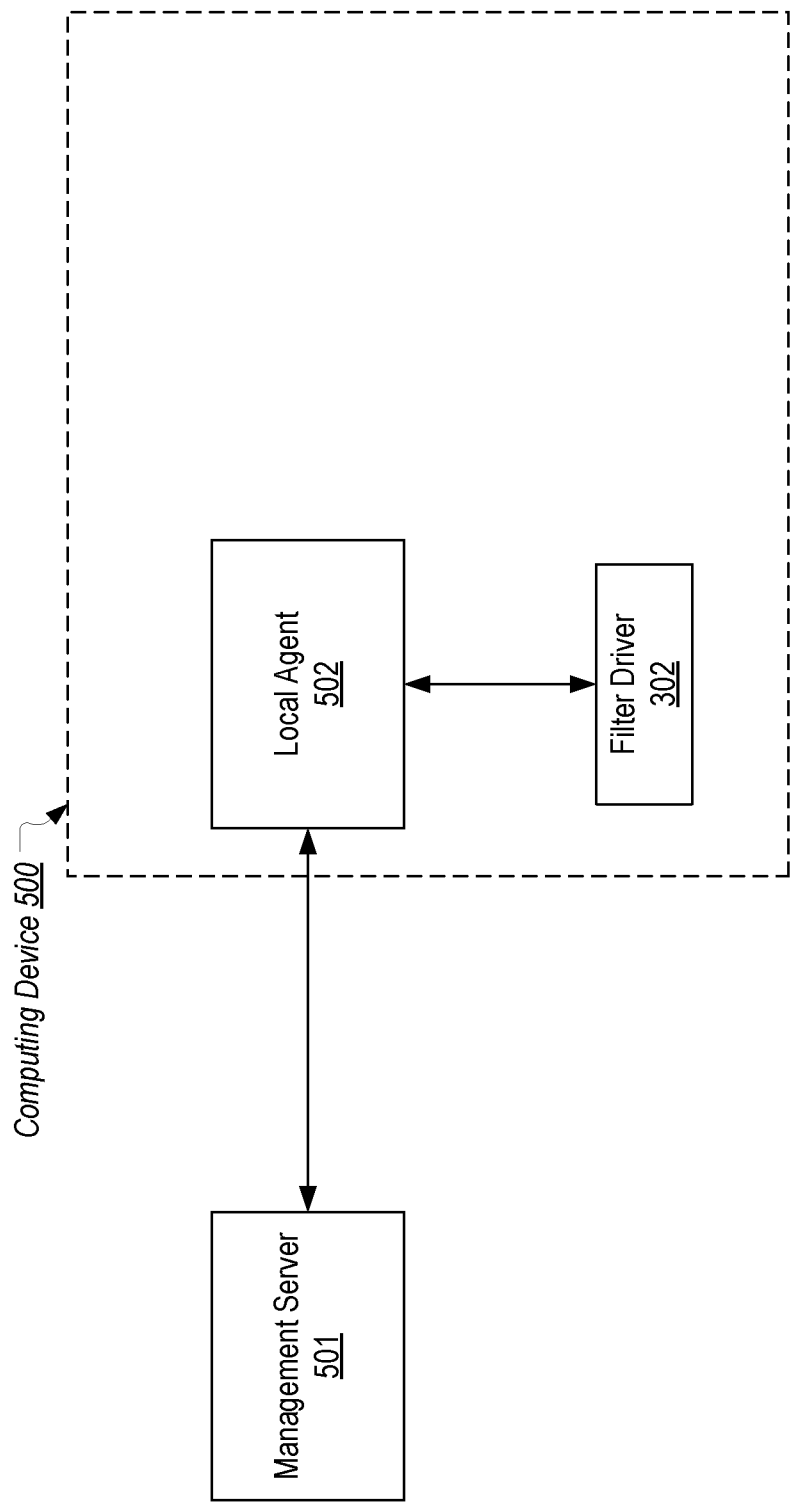

DIFFERENTIATING AND MANAGING IDENTICAL USB DEVICES

CROSS-REFERENCE TO RELATED APPLICATIONS

N/A

BACKGROUND

The present invention is generally directed to techniques for differentiating and managing identical USB devices. These techniques can be implemented on a computing device when the USB device is locally connected as well as when the USB device is redirected. The following overview of USB device redirection will be given to provide context for how a redirected USB device can be managed. It is noted that much of this overview equally pertains to local connection scenarios, e.g., the building of the device stack.

USB device redirection is a technique performed in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102*a*-102*n* (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client, the desktop running on server 104 may represent a virtual desktop environment. For purposes of this application, device 240 can represent a biometric device such as a fingerprint scanner.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106 (e.g., via a TCP or UDP socket). Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a Dell Wyse TCX USB bus driver, or any other bus driver) may be configured to create and store in memory a record corresponding to device 240. This record may include at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLO-BAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

FIG. 2A is largely the same as FIG. 2 but represents the architecture that would exist when a USB device is connected locally to a computing device 204. In this scenario, bus driver 230 (as opposed to virtual bus driver 260) will be loaded on computing device 204 and will sit towards the bottom of the device stack for the locally connected USB device 240.

As indicated above, when a USB device is connected to a computing device (e.g., to client 102, server 104, or computing device 204), the device information will be read from the USB device and reported to the plug and play component of the operating system to cause the appropriate device stack to be loaded. This process is oftentimes referred to as enumeration. In a local connection scenario, bus driver 230 (which can represent the Windows-provided USB hub driver (Usbhub3.sys or Usbhub.sys)) would initiate this enumeration, while in the redirection scenario, virtual bus driver 260 would initiate the enumeration on the server.

Organizations routinely employ a management solution, such as Active Directory, to control and manage their users' computing devices including defining which USB devices the users can connect. For example, in an Active Directory environment, an administrator can create a group policy (or group policy object) which defines the USB devices that a particular group of users can connect to their computing devices.

To enforce a group policy pertaining to USB devices, the management solution will monitor the enumeration process that is performed when a USB device is connected and apply the rules of any applicable group policy. If the applicable group policy defines that the enumerated USB device should be blocked, the management solution will prevent the enumeration process from loading the device stack thereby preventing the USB device from being accessed. This is true whether the USB device is connected locally or remotely.

These management solutions allow USB devices to be managed using different types of device information including hardware identifiers (e.g., the combination of the USB device's vendor ID, product ID and possibly revision) and USB class identifiers (e.g., the combination of the USB device's class, sub-class and protocol). The management solutions may also allow USB devices to be managed using Windows identifiers (e.g., the class name (Battery, Biometric, Bluetooth, DiskDrive, etc.) or class GUID that the Windows operating system assigns to particular classes of devices during installation).

One problem that exists with current management solutions is that they do not provide a way to uniquely identify and manage a particular USB device. In other words, the management solutions only allow USB devices to be managed at the hardware identifier, USB class identifier, or Windows identifier level. Because many USB devices will share the same hardware, USB class and or Windows identifiers, they will be "identical" from a management perspective.

As an example, if an administrator desires to allow a particular user to connect his or her particular USB pen drive (e.g., the Kingston DataTravel G2), the administrator would identify the USB pen drive in the applicable group policy as an allowed USB device (e.g., by specifying the Vendor ID and Product ID of the USB pen drive). As a result, all users governed by the applicable group policy would then be allowed to connect the same type of USB pen drive (e.g., any USB device having the same Vendor ID and Product ID as the USB pen drive). This would be the result regardless of whether hardware identifiers, USB class identifiers or Windows identifiers are used to identify the USB device within the group policy.

Therefore, with current solutions, there is no way for the administrator to allow only the particular user's USB pen drive to be connected. More particularly, there is no way for the administrator to uniquely identify the particular USB pen drive during enumeration and then selectively allow or block the particular USB pen drive based on the unique identification.

BRIEF SUMMARY

The present invention extends to methods, systems, and computer program products for differentiating and managing identical USB devices. During enumeration, a filter driver can be loaded on the device stack of any USB device to enable it to selectively allow or block the particular USB device based on a unique identifier of the USB device. The filter driver can obtain this unique identifier of the particular USB device and compare it to an applicable policy to determine whether the particular USB device is allowed. If the policy indicates that a USB device having the unique identifier should be blocked, the filter driver can stop the enumeration process so that the USB device cannot be accessed.

In some embodiments, the present invention is implemented by a filter driver as a method for managing a particular USB device. During enumeration of a first USB device on a computing device, the filter driver retrieves a unique identifier of the first USB device. The filter driver compares the unique identifier to a policy that includes unique identifiers of USB devices that are to be allowed or blocked. Based on the comparison of the unique identifier to the policy, the filter driver determines that the first USB device is not allowed. The filter driver then stops the enumeration of the first USB device to prevent the first USB device from being accessible on the computing device.

In other embodiments, the present invention is implemented as a method for managing a particular USB device. During enumeration of a first USB device on a computing device, a unique identifier of the first USB device is retrieved. The unique identifier comprises one or both of a USB container ID or a serial number. The unique identifier is used to query a policy that governs connection of USB devices. It is then determined that the policy indicates that the unique identifier represents a USB device that is not allowed. The first USB device is prevented from being accessible on the computing device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4J illustrate the process by which the filter driver selectively allows or blocks a particular USB device based on a unique identifier of the particular USB device;

FIGS. 5 and 5A-5C illustrate how permission to connect a particular USB device can be obtained dynamically in response to the particular USB device being blocked.

DETAILED DESCRIPTION

The present invention provides a way for an administrator to selectively allow or block a particular USB device using a unique identifier of the USB device. Therefore, with the present invention, the administrator will have more granular control over USB devices that may be connected to the computing devices that he or she manages. The present invention also provides a way for an end user to dynamically receive permission to connect a particular USB device.

Figure 1:
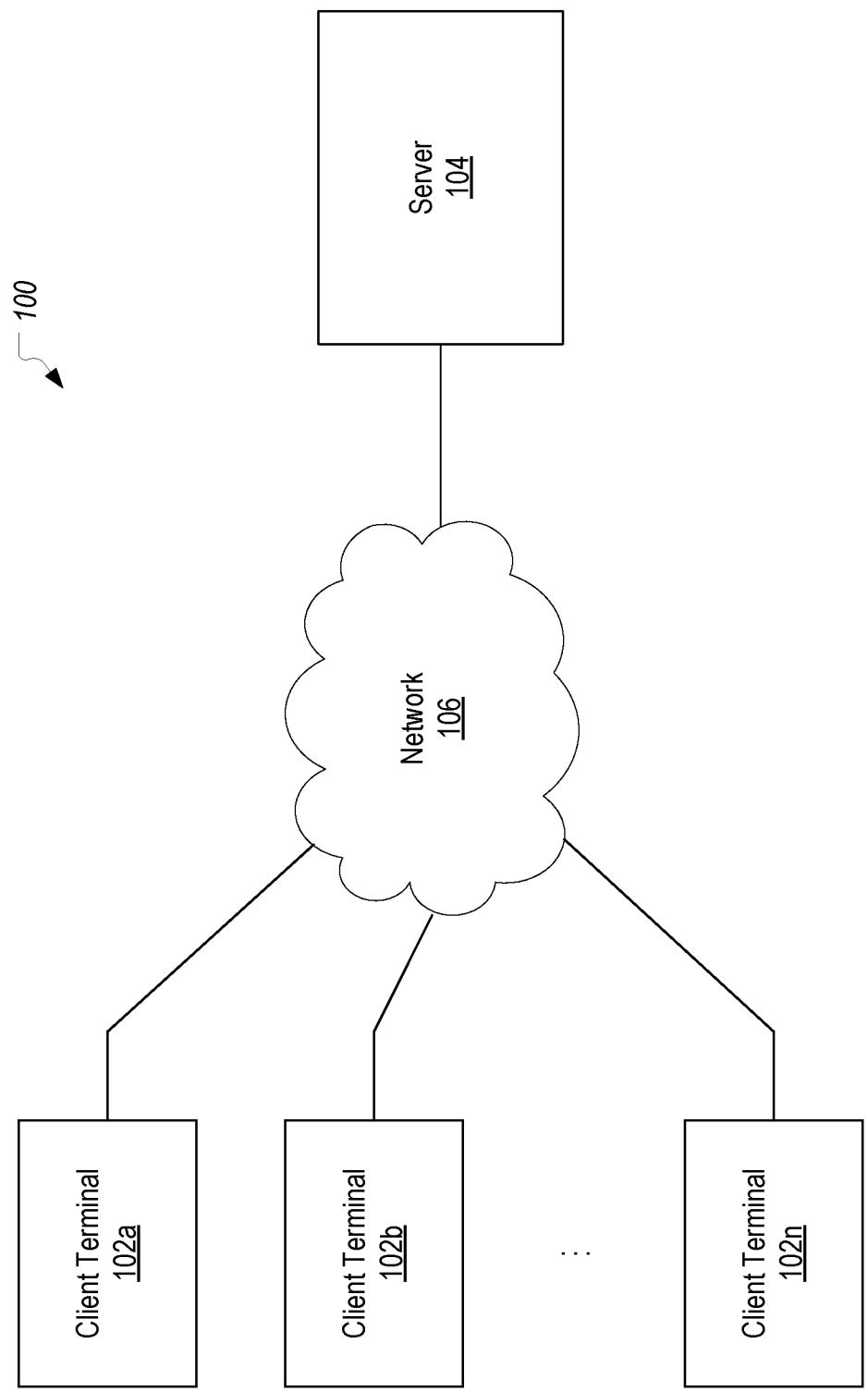
FIG. 1 illustrates an example computing environment in which the present invention can be implemented.
Figure 2:
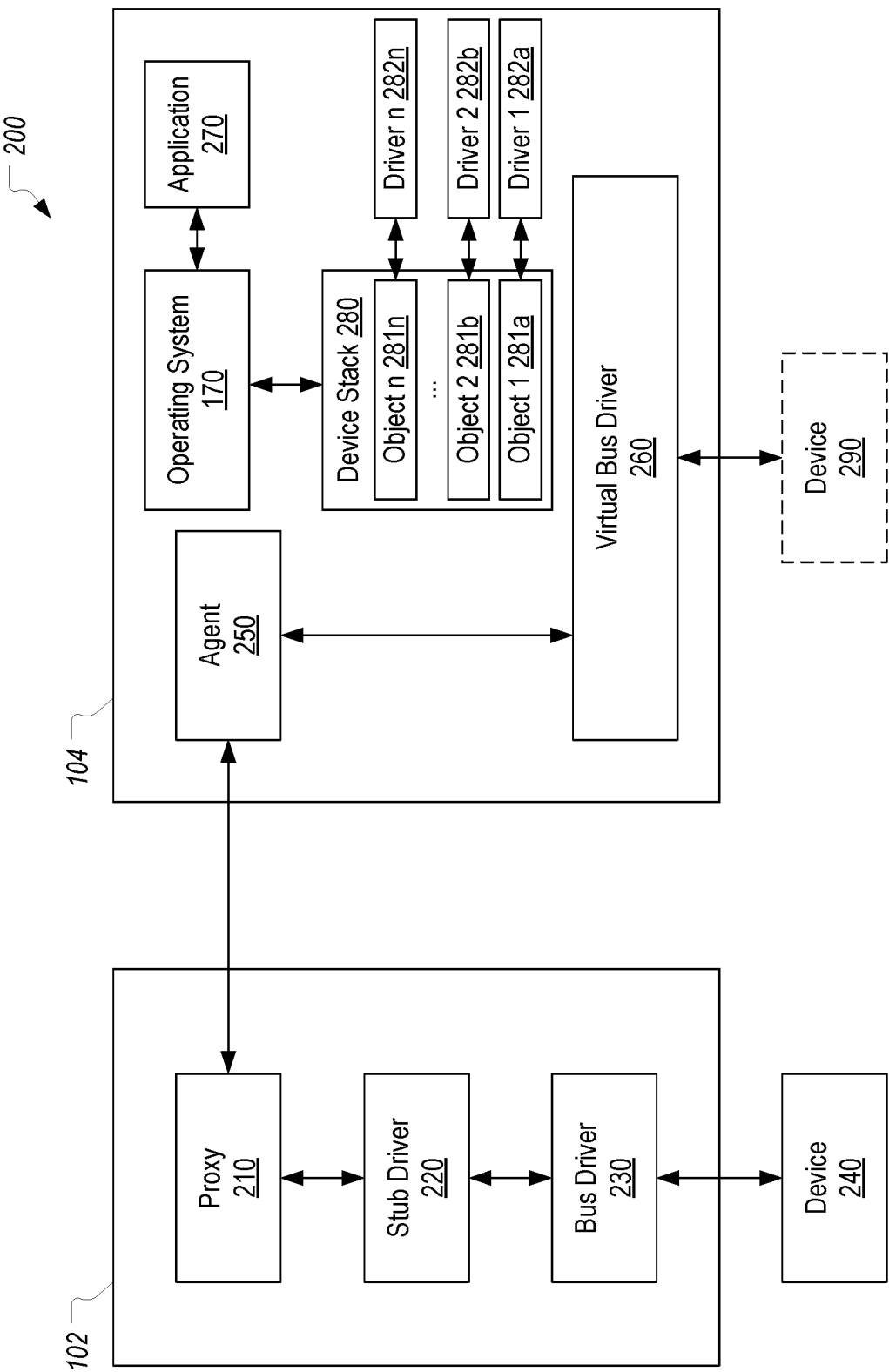
FIG. 2 illustrates a general architecture that may exist when a USB device is redirected from a client terminal to a server.
Figure 2A:
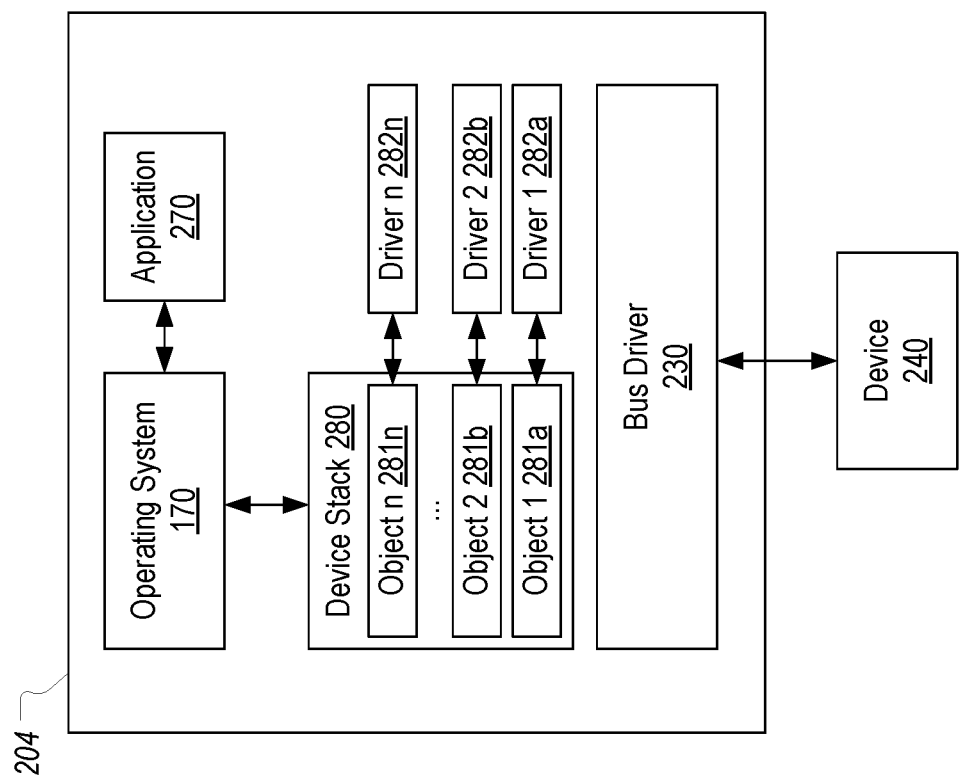
FIG. 2A illustrates a general architecture that may exist when a USB device is connected locally to a computing device.
Figure 3:
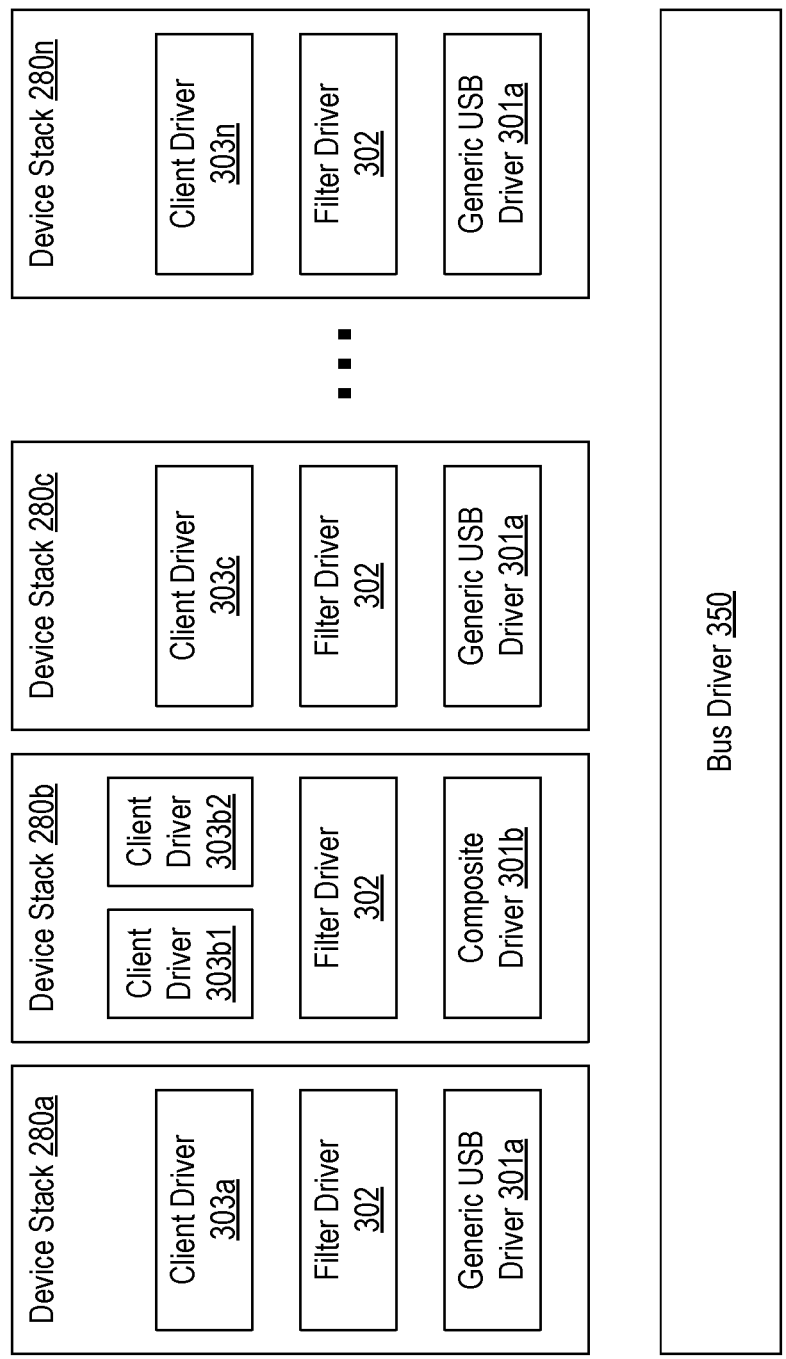
FIG. 3 illustrates how a filter driver can be employed to implement embodiments of the present invention.

FIG. 3 illustrates an example of how the USB architecture may be configured when the present invention is implemented. FIG. 3 which is a generalization of the architectures shown in FIGS. 2 and 2A includes bus driver 350 which can represent either bus driver 230 or virtual bus driver 260 depending on whether the USB device is connected locally or redirected. Bus driver 350 is positioned below a number of USB device stacks 280a-280n each of which represents a particular USB device.

In accordance with USB device enumeration techniques, when a USB device is physically connected to a computing device, the "device information" will be read from the USB device. Once bus driver 350 has obtained the device information (either directly in the case of bus driver 230 or via proxy 210/agent 250 in the case of virtual bus driver 260), it will notify the plug and play component of operating system 170 (e.g., by calling IoInvalidateDeviceRelations in Windows). At this point, the plug and play component will send a number of I/O requests (or IRPs) to obtain the portions of the device information that are necessary to load the appropriate device stack.

If the connected USB device is not a composite device, a generic USB driver 301a (e.g., Winusb.sys) will typically be loaded. In contrast, if the connected USB device is a composite device, a composite driver 301b (e.g., Usbccgp.sys) will typically be loaded. In accordance with embodiments of the present invention, a filter driver 302 can be loaded in each USB device stack (e.g., device stacks 280a-280n) above generic USB driver 301a or composite driver 301b. Stated another way, filter driver 302 is layered on top of bus driver 350 and attaches to every USB physical device object (PDO) that bus driver 350 enumerates. Therefore, filter driver 302 will be able to modify the enumeration process to control whether the corresponding client driver will be loaded. Accordingly, FIG. 3 would represent a scenario where filter driver 302 has not blocked any of the corresponding USB devices.

Figure 4B:
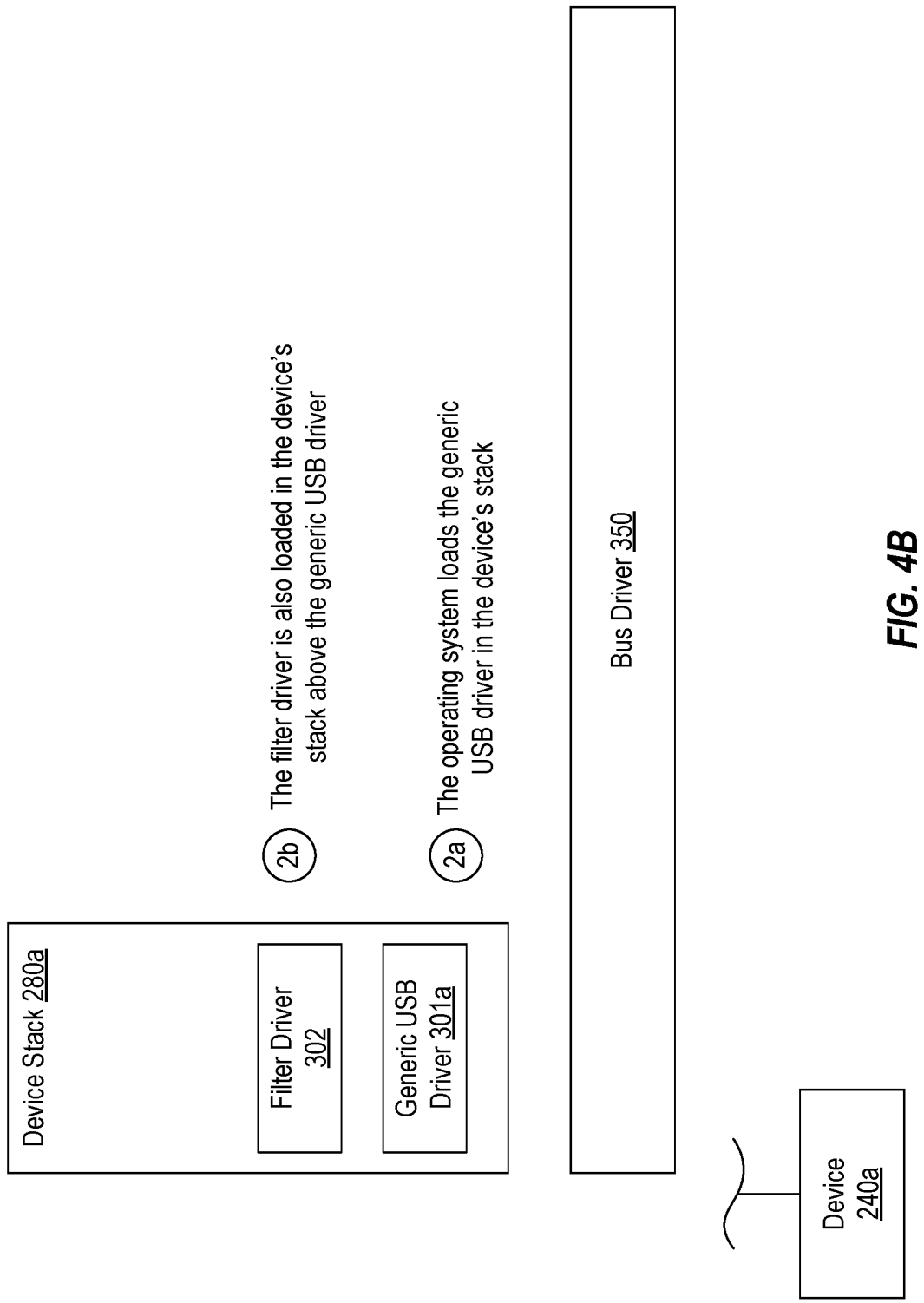

FIGS. 4A-4J illustrate a sequence of steps that would occur during enumeration of a USB device when the present invention is implemented. FIGS. 4A-4E represent a scenario where a USB device is allowed, while FIGS. 4F-4J represent a scenario where a USB device is blocked. In FIG. 4A, it is assumed that device 240a has just been connected to a computing device (whether locally or remotely). In response, in step 1a, bus driver 350 will obtain the device information from device 240a. As addressed in the background, this device information may include the device descriptor, configuration descriptor, etc. that are needed to load the proper device stack.

As mentioned above and as represented in step 1b, once bus driver 350 has obtained this device information, it will then notify the plug and play component of the operating system that a new device has been connected (e.g., by calling IoInvalidateDeviceRelations). In response, and as represented in step 2a in FIG. 4B, the operating system will load generic USB driver 301a in device stack 280a (assuming device 240a is not a composite device). Also, because filter driver 302 is configured to be attached to any PDO enumerated by bus driver 350, it will also be loaded in device stack 280a above generic USB driver 301a in step 2b. Notably, at this point, the enumeration has not yet proceeded to the point where the client driver is loaded.

Figure 4C:
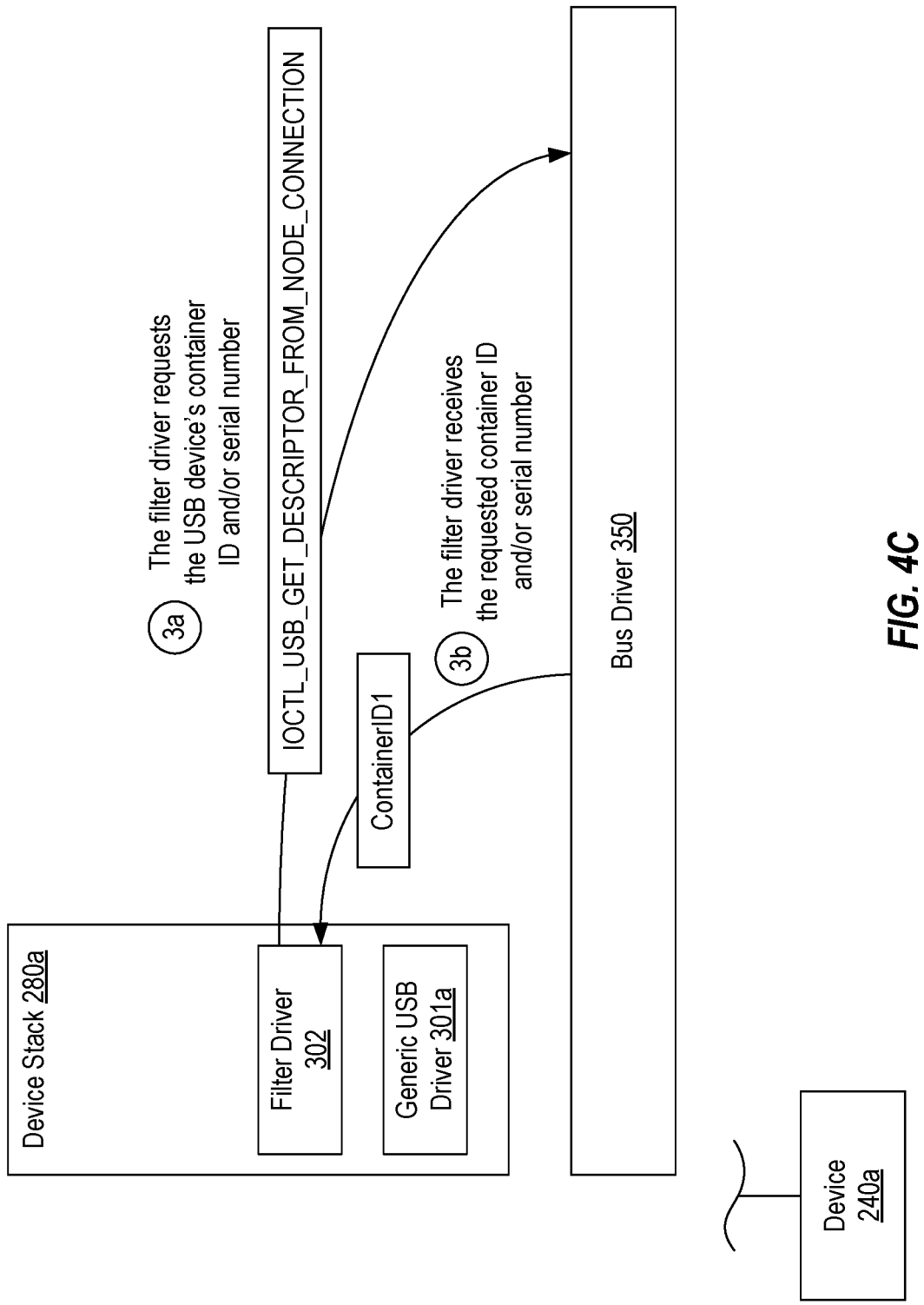

Turning to FIG. 4C, in step 3a, filter driver 302 can request device 240a's container ID and/or serial number. As an example, this could be accomplished by sending the IOCTL_USB_GET_DESCRIPTOR_FROM_NODE_CONNECTION I/O control request to bus driver 350 with the accompanying USB_DESCRIPTOR_REQUEST structure defining a descriptor type of USB_STRING_DESCRIPTOR_TYPE and specifying the index of the container ID or serial number. Filter driver 302 can send this IOCTL at any suitable time prior to the client driver being loaded such as, for example, during its AddDevice routine or during the handling of an I/O request such as the IRP_MN_QUERY_ID I/O request. As shown in step 3b, it will be assumed that device 240a's container ID is "ContainerID1." For simplicity, it will be assumed that device 240a's serial number is not separately received.

It is noted that a USB container ID, which is in the form of a UUID string, may be provided by the manufacturer and stored in the device's firmware or may be created by bus driver 350 as a combination of the device's product ID, vendor ID, revision number and serial number. In either case, the container ID should be unique to the device. The serial number is a manufacturer-provided value and is stored in the device's firmware. The serial number alone may not necessarily be unique and therefore, in some embodiments, the container ID may preferably be used as a unique identifier of a particular USB device.

Figure 4D:
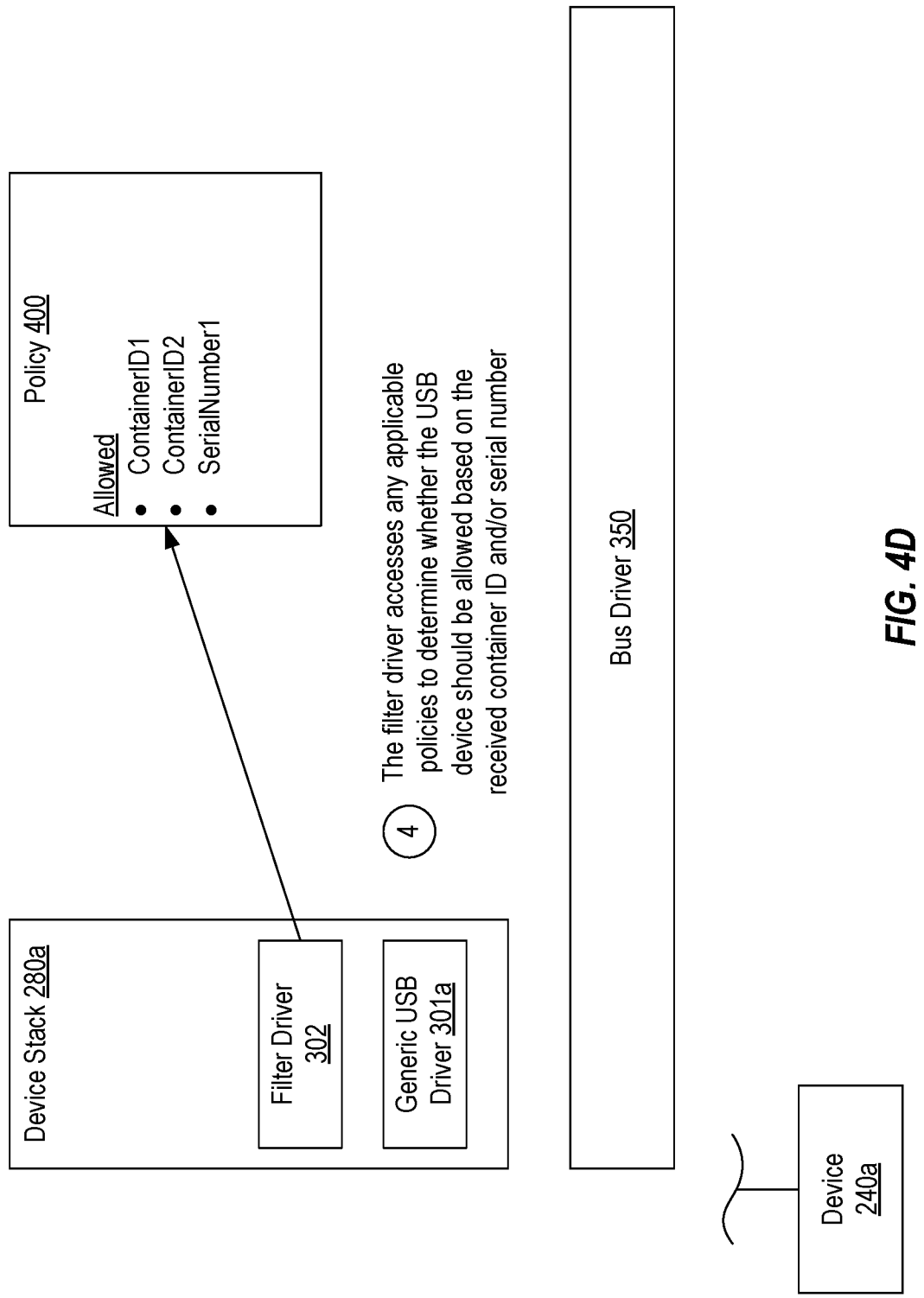

Turning to FIG. 4D, once filter driver 302 has retrieved device 240a's container ID, it can employ the container ID to query a policy 400 that governs the connection of USB devices. Policy 400 can be stored and accessed on the computing device in any suitable manner. For example, policy 400 could be stored in the Windows registry. In some embodiments, filter driver 302 may communicate with another component (e.g., an agent service) that in turn queries policy 400. In any case, filter driver 302 employs the unique identifier (whether the container ID, serial number or both) that it retrieved to determine whether policy 400 dictates that device 240*a* should be allowed. Policy 400 could be structured in any suitable manner including as a whitelist of allowed USB devices or a blacklist of disallowed USB devices. As represented in this example, policy 400 lists ContainerID1 as the unique identifier of an allowed USB device.

Figure 4E:
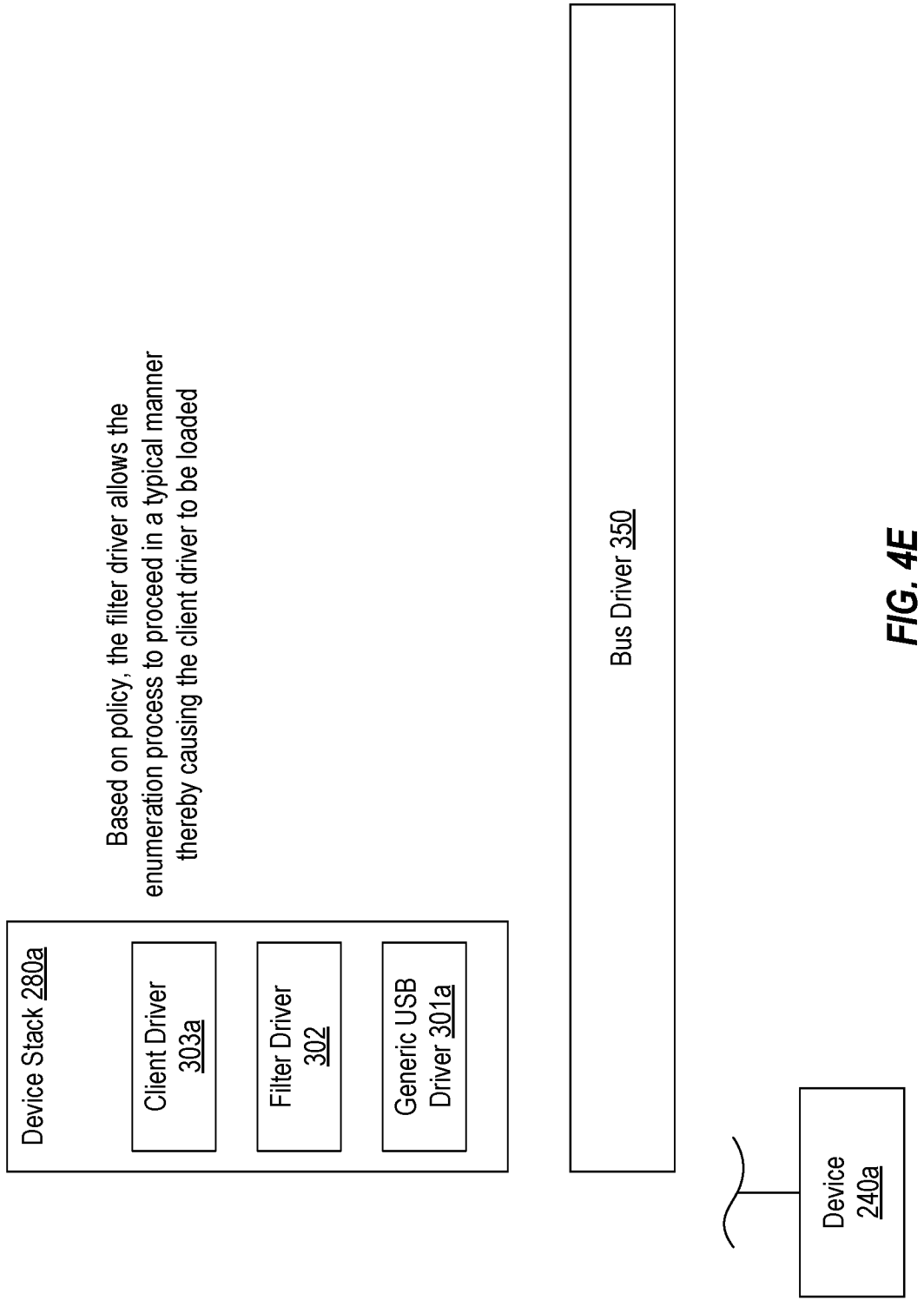

Turning to FIG. 4E, because policy 400, which is in the form of a whitelist, includes ContainerID1, filter driver 302 will determine that device 240*a* can be connected to the computing device. As such, filter driver 302 can allow the enumeration process to continue in a typical manner. This will result in client driver 303*a* being loaded on device stack 280*a* at which point device 240*a* should become accessible to the user.

Figure 4F:
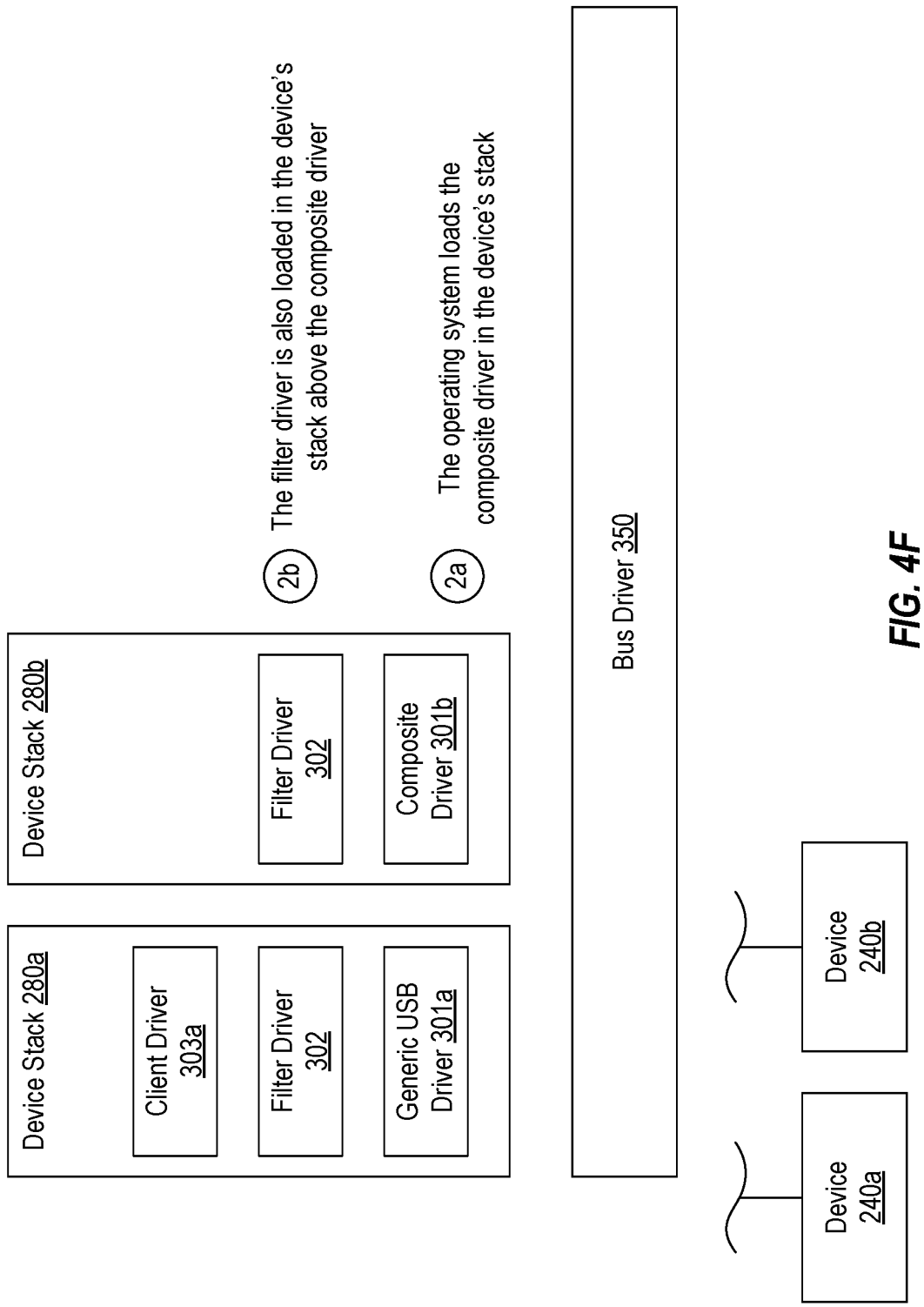
Figure 4G:
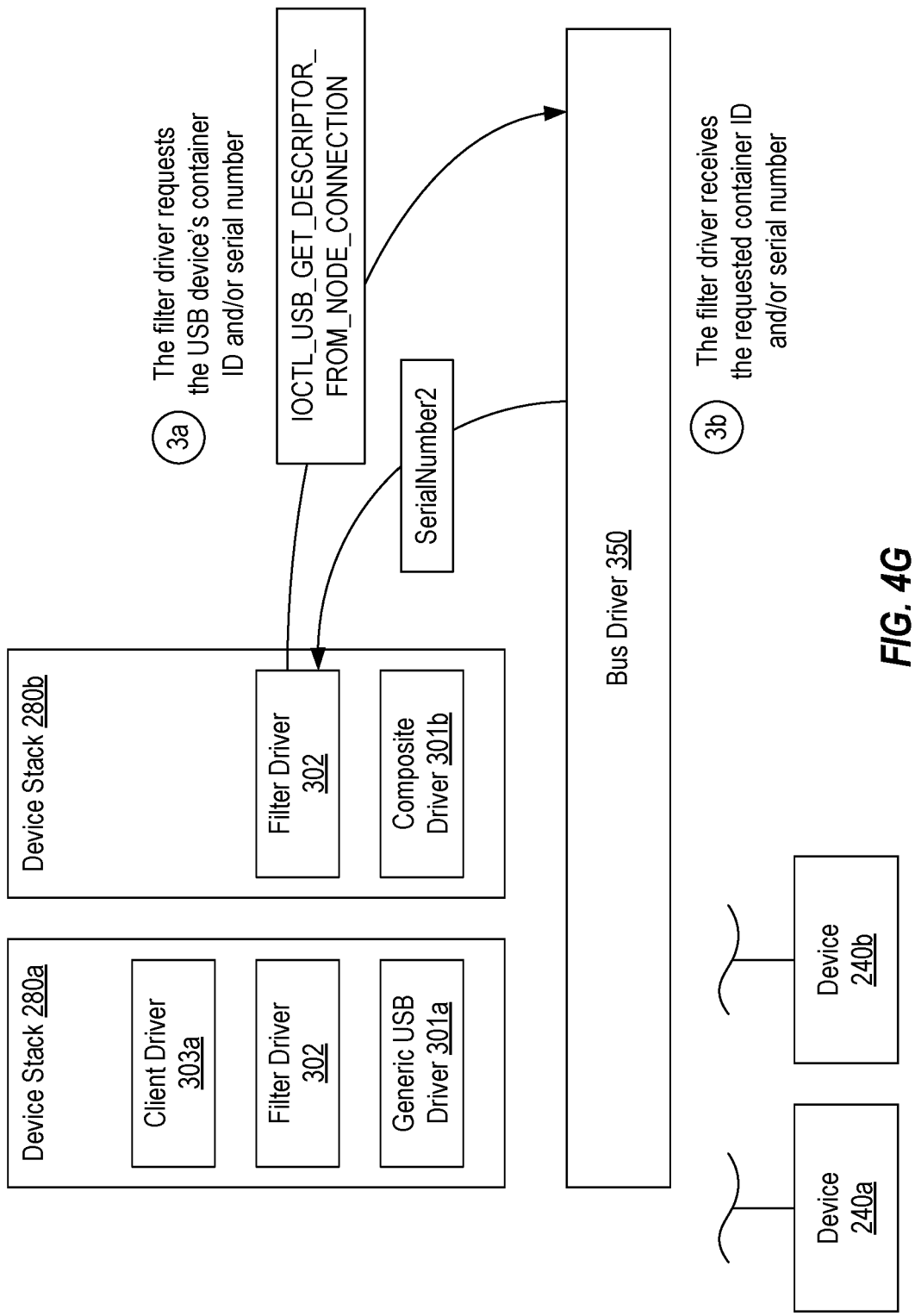

Transitioning now to FIG. 4F, it is assumed that another USB device 240*b*, which is a composite device, is connected to the computing device (whether locally or via redirection). For illustrative purposes only, it will be assumed that device 240*b* is connected to the same computing device while device 240*a* is also connected. As a result of device 240*b* being connected, the same process as described above will be performed resulting in composite driver 301*b* (step 2*a*) and filter driver 302 (step 2*b*) being loaded on device stack 280*b*. Also, as shown in FIG. 4G, filter driver 302 will request the container ID and/or serial number of device 240*b* (step 3*a*) and is assumed to receive a serial number of "SerialNumber2" in response (step 3*b*). Next, in step 4 shown in FIG. 4H, filter driver 302 will employ "Serial-Number2" to query policy 400. In this example, the query will reveal that device 240*b* is not allowed because Serial-Number2 is not included in the list of unique identifiers of allowed USB devices.

Figure 4I:
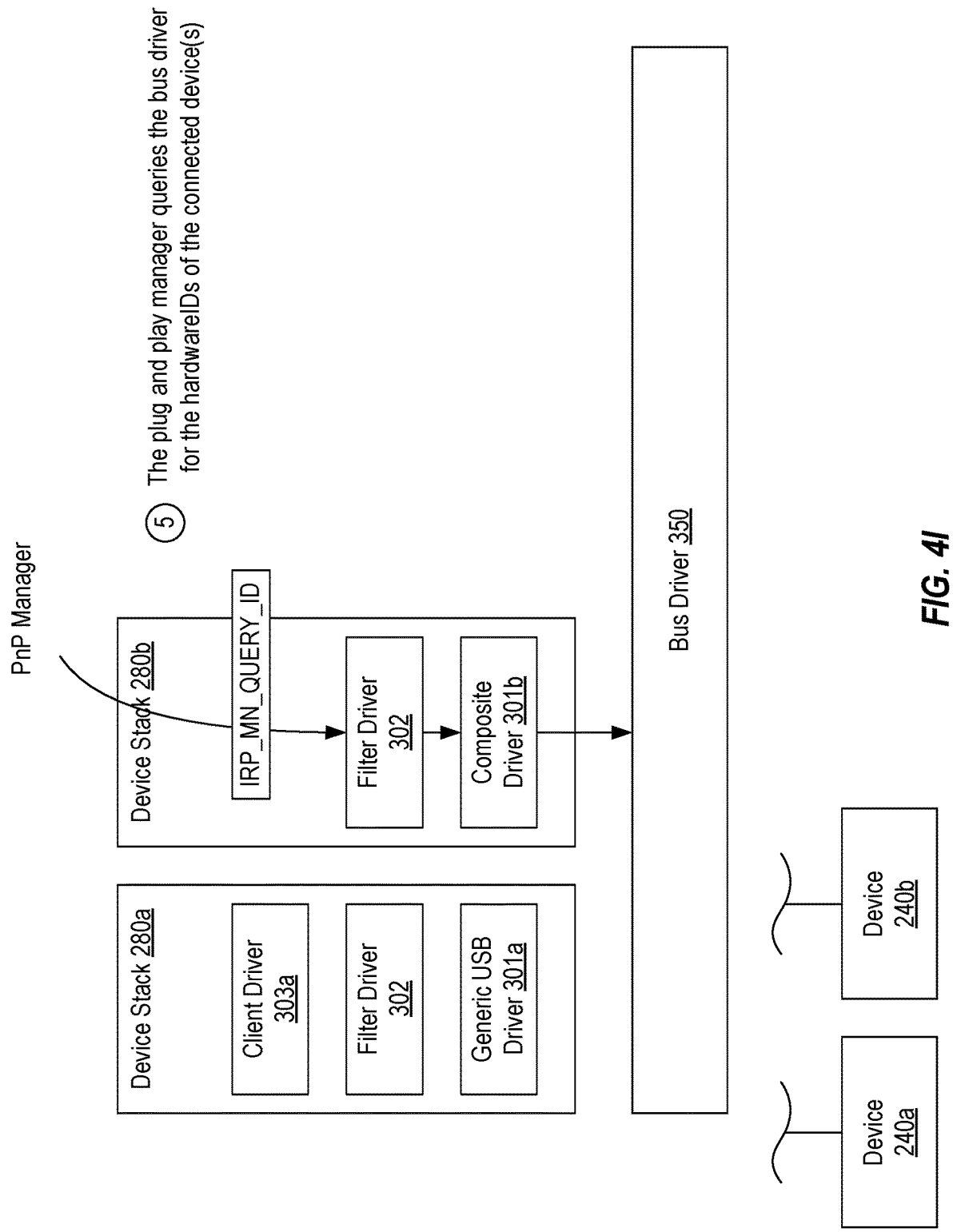
Figure 4J:
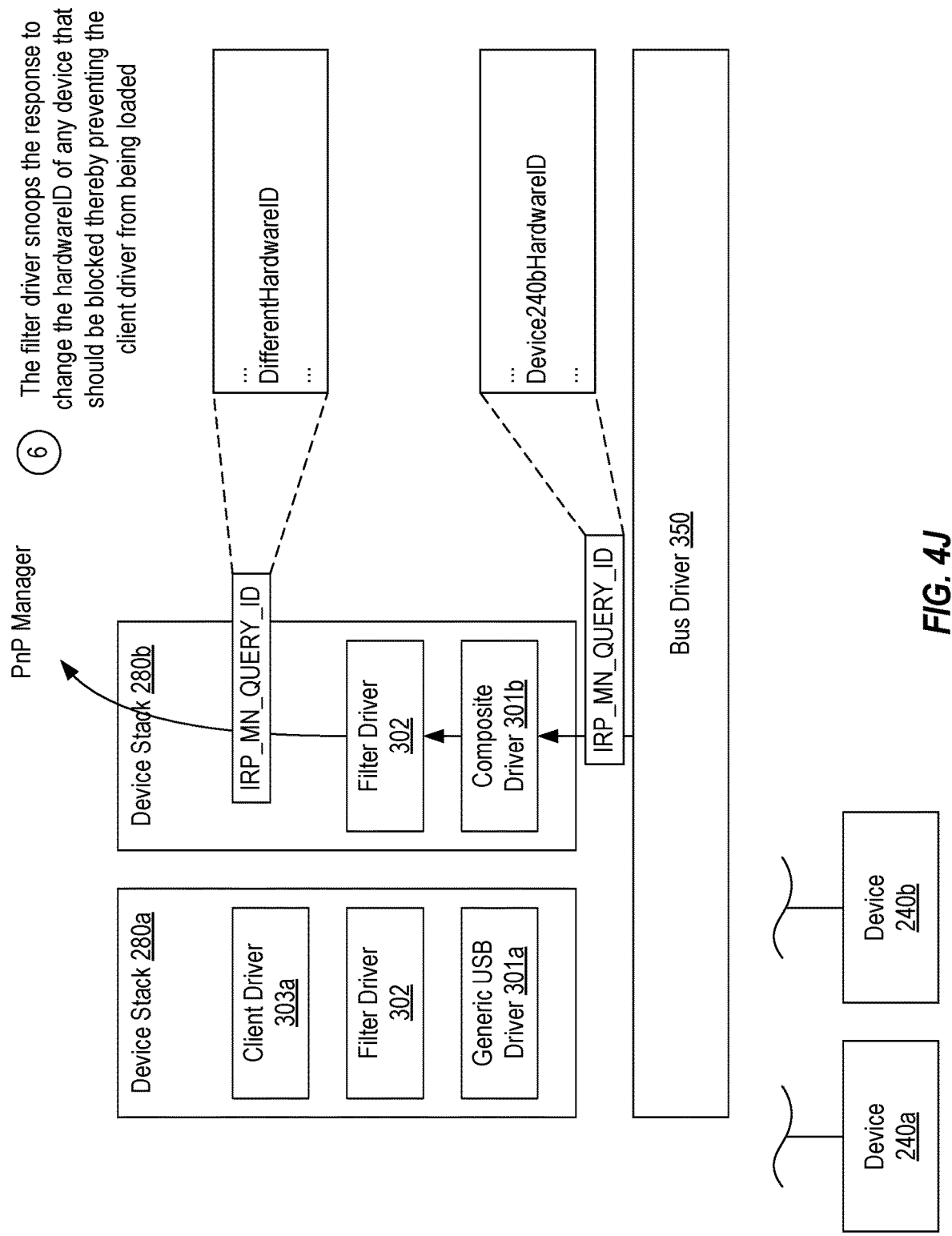

Because device 240*b* is not allowed, filter driver 302 can stop the enumeration process to thereby prevent the client driver(s) for device 240*b* from being loaded. FIGS. 4I and 4J illustrate one example of how filter driver 302 can stop the enumeration process. In step 5 shown in FIG. 4I, the plug and play component is shown as sending an IRP_MN_QUERY_ID I/O request down device stack 280*b*. The plug and play component sends this IRP when a device is enumerated in order to obtain the IDs (e.g., a Hardware ID) necessary for identifying the client driver that should be loaded on the device's stack. As mentioned above, in some embodiments, filter driver 302 could be configured to perform step 4 and possibly steps 3*a* and 3*b* in response to this IRP, while in other embodiments, steps 3*a*, 3*b* and 4 can be performed at an earlier stage of the enumeration process.

In any case, filter driver 302 can allow this IRP to be completed by bus driver 350. As a result, the completed IRP containing the hardware ID (or other ID such as a compatible ID) will be passed back up device stack 280*b*. As shown in FIG. 4J, it is assumed that bus driver 350 has populated the accompanying data structure to include a hardware ID of "Device240bHardwareID." Based on policy 400, filter driver 302 can modify the IRP_MN_QUERY_ID request to prevent a client driver from being loaded for a blocked USB device. For example, in step 6, filter driver 302 changes the hardware ID reported in IRP_MN_QUERY_ID so that it no longer represents a valid hardware ID. As a result, the plug and play component will not be able to identify an appropriate client driver to load on device stack 280*b*. Given that the plug and play component may send multiple IRP_MN_QUERY_ID requests to obtain different types of identifiers (e.g., hardware and compatible IDs), step 6 can be repeated as necessary.

To summarize, filter driver 302 obtains a unique identifier (the container ID and/or the serial number) of each USB device and employs this unique identifier during the enumeration process to selectively allow or block a particular USB device. This enables an administrator to manage specific USB devices by their unique identifier(s).

In some embodiments, the present invention may also provide a way to dynamically request approval to connect a specific USB device. FIG. 5 illustrates additional components that can be employed in conjunction with filter driver 302 to accomplish this. As shown, a local agent 502 can be executed along with filter driver 302 on a computing device 500. Local agent 502, which could be agent 250 in the redirection environment or any other device management service, can be configured to communicate with a management server 501.

Figure 5A:
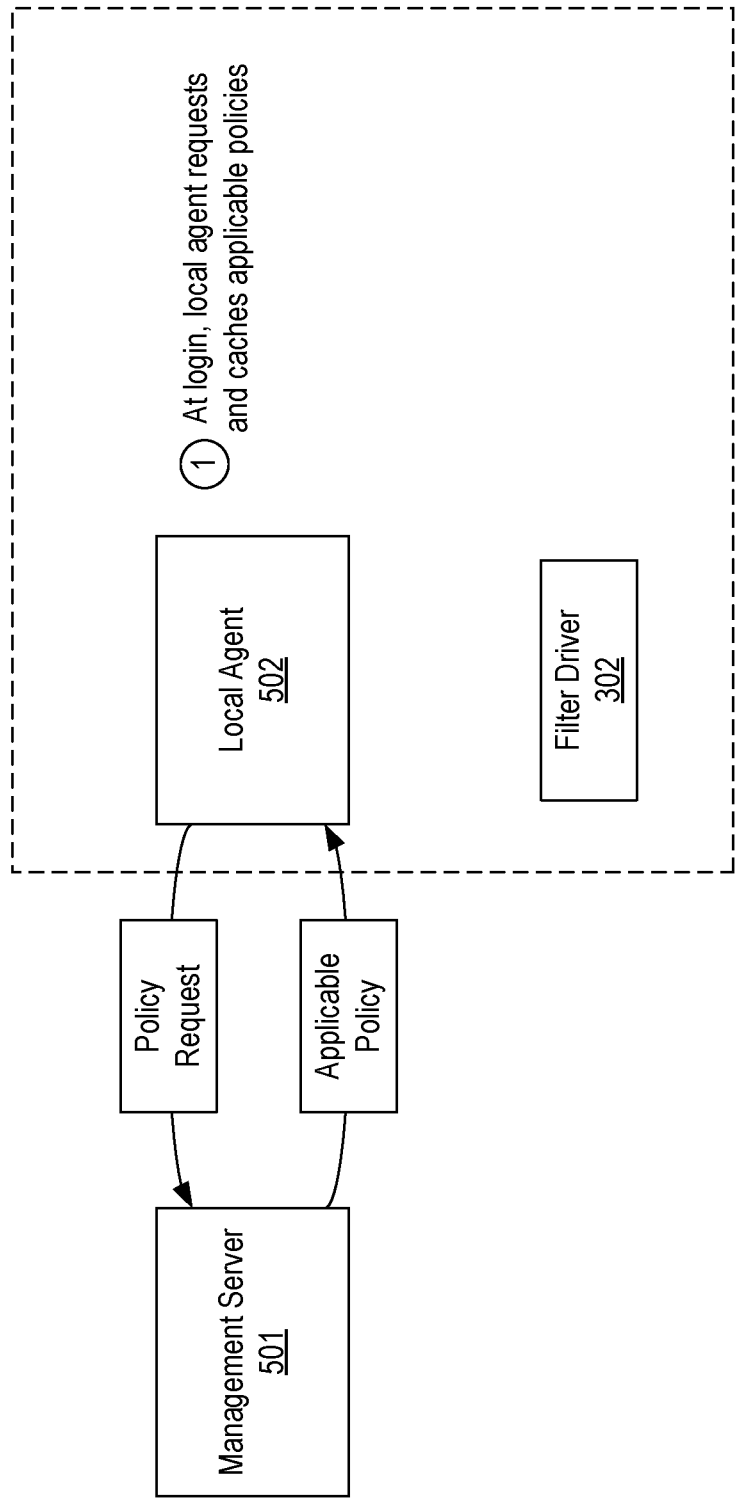
Figure 5B:
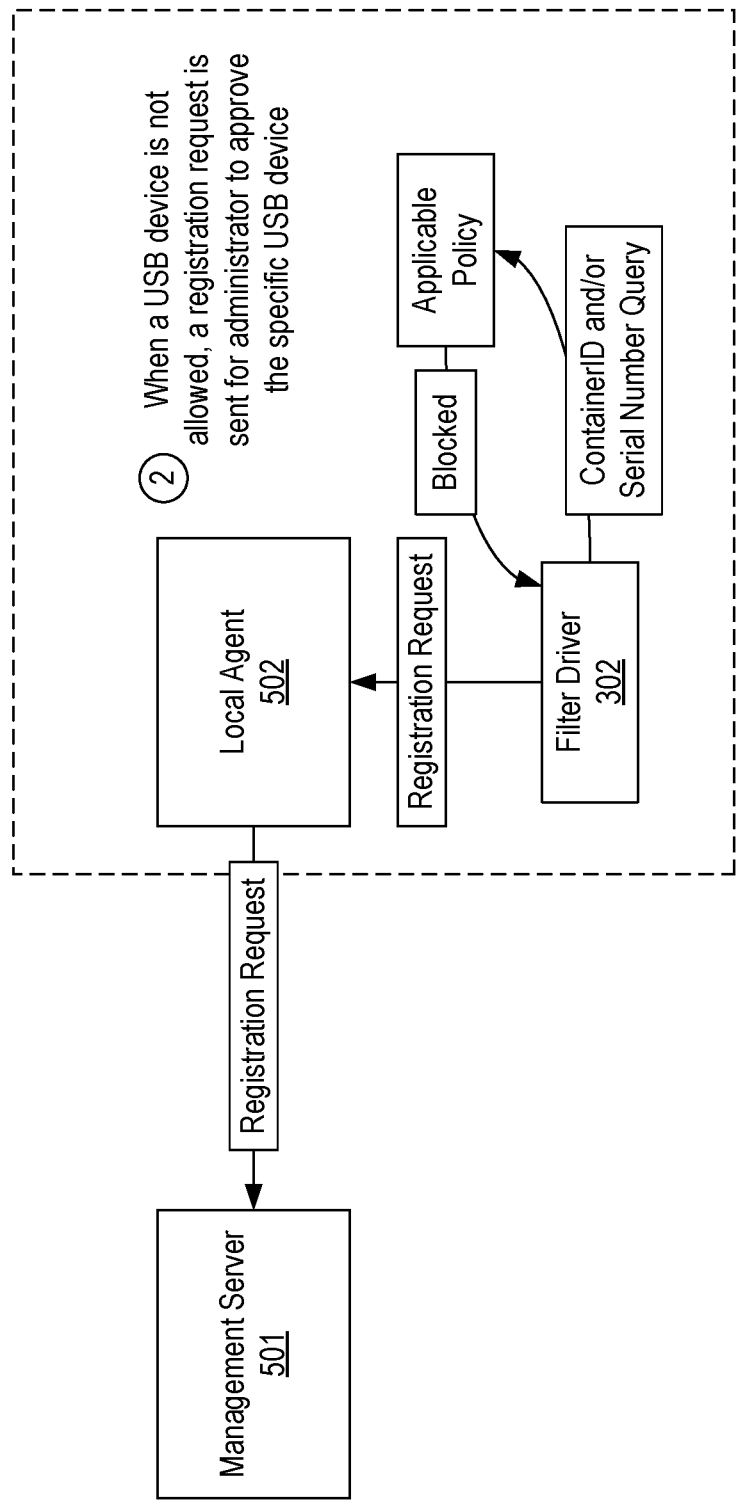
Figure 5C:
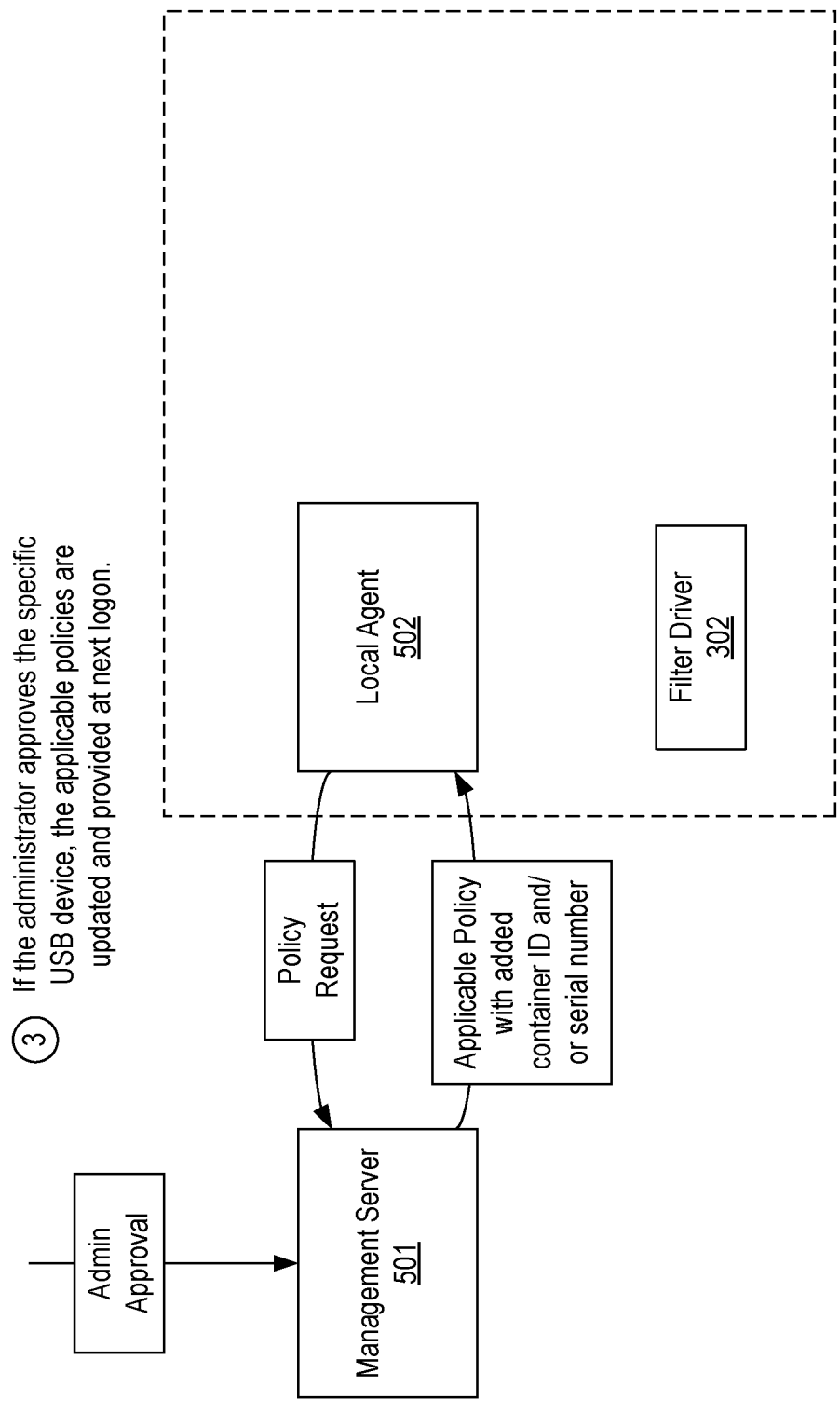

FIGS. 5A-5C illustrate how filter driver 302 can cause a request for approval to be sent to management server 501 when a particular USB device is blocked. In FIG. 5A, it is assumed that the user has logged into a session on computing device 500, and, as part of this login, local agent 502 has requested any policies applicable to the user's session. Local agent 502 can cache any applicable policies it receives to allow filter driver 302 to perform step 4 of the above-described process.

FIG. 5B represents that filter driver 302 has determined, based on the applicable policy, that a particular USB device should be blocked. For example, filter driver 302 could have performed the steps shown in FIGS. 4F-4J to determine that the USB device with a serial number of SerialNumber2 is not currently allowed. At this point, filter driver 302 can notify local agent 502 (as represented by the registration request) that the USB device was blocked and provide local agent 502 with information about the blocked USB device including the container ID and/or serial number of the blocked USB device. In turn, local agent 502 can submit a registration request to management server 501 that identifies the user of computing device 500 and includes the information about the blocked USB device. This will enable management server 501 to present to an administrator a request to approve the particular USB device for use by the particular user. In some embodiments, local agent 502 may first prompt the user to confirm that he or she desires the registration request to be sent to management server 501. Also, in some embodiments, local agent 502 can be configured to send registration requests only for certain types of USB devices and/or for certain groups of users. For example, local agent 502 can be configured to never send a registration request for a type of USB device that the administrator will always block.

Finally, in FIG. 5C, assuming the administrator approves the request, management server 501 can update any applicable policy to reflect that the particular user is allowed to connect the particular USB device (e.g., by adding Serial-Number2 to policy 400). Then, at the next login, local agent 502 will retrieve the updated policy which now includes the container ID and/or serial number of the previously blocked USB device. As a result, filter driver 302 will not block the USB device when it is again connected.

The process depicted in FIGS. 5A-5C can greatly facilitate the management of specific USB devices. For example, the container ID or serial number of a USB device is not easily ascertainable without connecting the USB device. This process enables the container ID and/or serial number to be automatically provided to the administrator and included in the applicable policy with minimal user involvement. Without this process, the administrator would need to manually input the container ID and/or serial number into any applicable policy, which, given the length of these unique identifiers and the process of retrieving them, would be burdensome.

In summary, the present invention would allow multiple devices that have the same vendor ID and product ID to be managed individually. Furthermore, the present invention would allow a particular USB device to be linked to a particular user. This granular level of management would enhance security because it would no longer be necessary to grant access to all devices with identical identifiers when it is only desired to allow a single user to connect a particular device.

Figure 6:
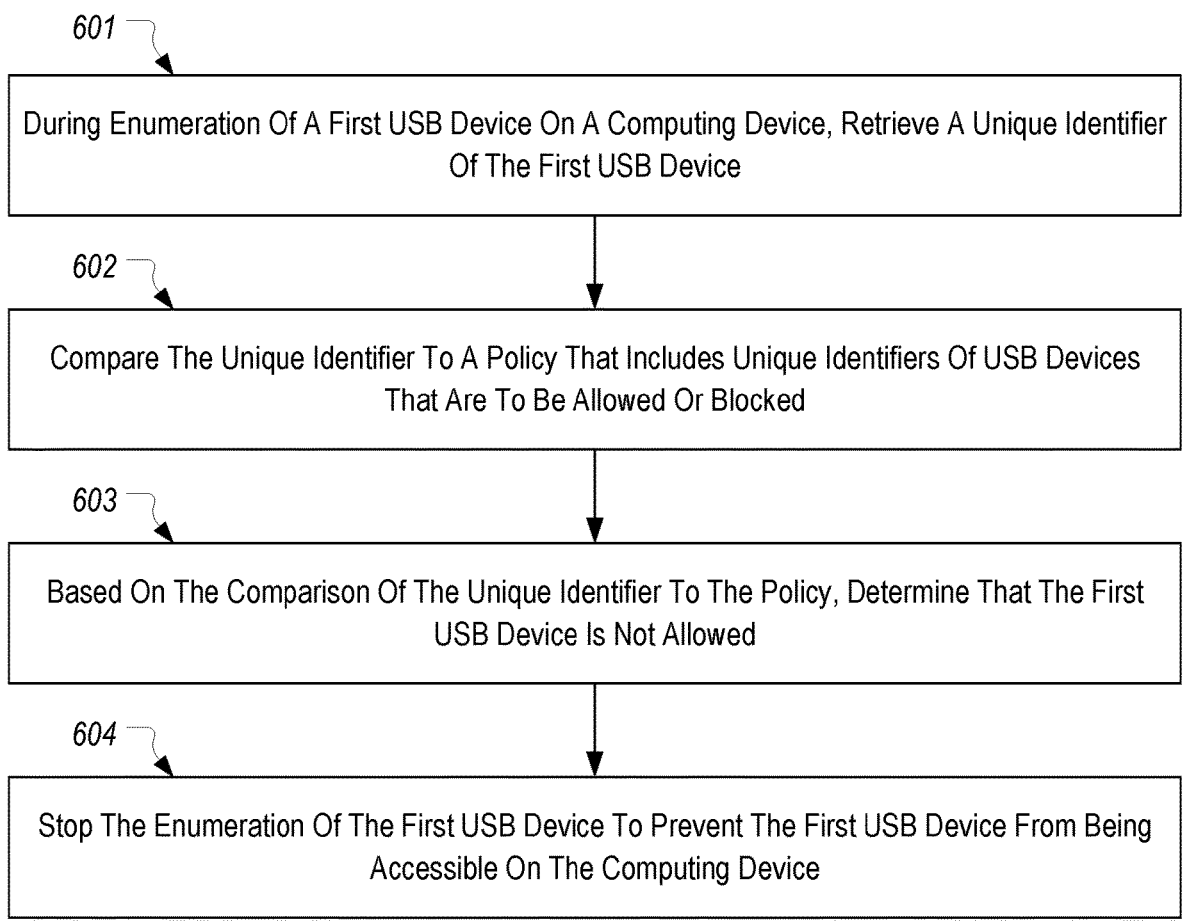
FIG. 6 illustrates a flowchart of an example method for managing a particular USB device.

FIG. 6 provides a flowchart of an example method 600 for managing a particular USB device. In some embodiments, method 600 can be implemented by filter driver 302 to manage a locally connected or redirected USB device.

Method 600 includes an act 601 of, during enumeration of a first USB device on a computing device, retrieving a unique identifier of the first USB device. For example, filter driver 302 can retrieve a container ID and/or serial number of device 240a or 240b.

Method 600 includes an act 602 of comparing the unique identifier to a policy that includes unique identifiers of USB devices that are to be allowed or blocked. For example, filter driver 302 can compare a container ID and/or serial number of device 240a or 240b to policy 400.

Method 600 includes an act 603 of, based on the comparison of the unique identifier to the policy, determining that the first USB device is not allowed. For example, filter driver 302 can determine that policy 400 dictates that device 240b should be blocked because its container ID and/or serial number is not whitelisted or is blacklisted.

Method 600 includes an act 604 of stopping the enumeration of the first USB device to prevent the first USB device from being accessible on the computing device. For example, filter driver 302 can modify an ID of device 240b that is reported to the operating system to prevent a client driver from being loaded.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a filter driver, for managing a particular USB device, comprising:
   during enumeration of a first USB device on a computing device, retrieving a unique identifier of the first USB device;
   comparing the unique identifier to a policy that includes unique identifiers of USB devices that are to be allowed or blocked;
   based on the comparison of the unique identifier to the policy, determining that the first USB device is not allowed; and
   stopping the enumeration of the first USB device to prevent the first USB device from being accessible on the computing device.

2. The method of claim 1, wherein retrieving the unique identifier of the first USB device comprises sending an I/O control request to retrieve a USB container ID or a serial number of the first USB device.

3. The method of claim 2, wherein the I/O control request is an IOCTL_USB_GET_DESCRIPTOR_FROM_NODE_CONNECTION request.

4. The method of claim 1, wherein the unique identifier is a USB container ID of the first USB device.

5. The method of claim 1, wherein the unique identifier is a serial number of the first USB device.

6. The method of claim 1, wherein the unique identifier comprises both a USB container ID and a serial number of the first USB device.

7. The method of claim 1, wherein the policy lists unique identifiers of USB devices that are allowed.

8. The method of claim 1, wherein the policy lists unique identifiers of USB devices that are blocked.

9. The method of claim 1, wherein stopping enumeration of the first USB device comprises modifying an identifier of the first USB device that is reported to the operating system to prevent a client driver from being loaded for the first USB device.

10. The method of claim 1, wherein stopping enumeration of the first USB device comprises modifying an IRP_MN_QUERY_ID request.

11. The method of claim 1, further comprising:
during enumeration of a second USB device on the computing device, retrieving a unique identifier of the second USB device;
comparing the unique identifier of the second USB device to the policy;
based on the comparison of the unique identifier of the second USB to the policy, determining that the second USB device is allowed; and
allowing the enumeration of the second USB device to proceed thereby causing the second USB device to be accessible on the computing device.

12. The method of claim 1, wherein the first device is a composite device and stopping the enumeration of the first USB device prevents each interface of the first USB device from being accessible on the computing device.

13. The method of claim 1, further comprising:
causing the unique identifier to be sent to a management server as part of a request to allow the first USB device to be accessed.

14. One or more computer storage media storing computer-executable instructions which when executed by one or more processors implement a method for managing a particular USB device, the method comprising:
during enumeration of a first USB device on a computing device, retrieving a unique identifier of the first USB device;
comparing the unique identifier to a policy that includes unique identifiers of USB devices that are to be allowed or blocked;
based on the comparison of the unique identifier to the policy, determining that the first USB device is not allowed; and
stopping the enumeration of the first USB device to prevent the first USB device from being accessible on the computing device.

15. The computer storage media of claim 14, wherein the method further comprises:
sending the unique identifier to a management server as part of a request to allow the first USB device to be accessible;
receiving an updated policy;
during a subsequent enumeration of the first USB device on a computing device, retrieving the unique identifier of the first USB device;
comparing the unique identifier to the updated policy;
based on the comparison of the unique identifier to the updated policy, determining that the first USB device is allowed; and
allowing the subsequent enumeration of the first USB device to proceed to cause the first USB device to be accessible on the computing device.

16. The computer storage media of claim 15, wherein the method further comprises:
wherein an agent service receives the unique identifier from a filter driver and then sends the unique identifier to the management server.

17. The computer storage media of claim 14, wherein the unique identifier is one or more of a USB container ID or a serial number.

18. The computer storage media of claim 15, wherein the method further comprises:
receiving, at the management server, input from an administrator that approves the request; and
in response to the input, generating the updated policy by adding or removing the unique identifier of the first USB device.

19. A method for allowing a particular USB device based on a unique identifier of the particular USB device, comprising:
during enumeration of a first USB device on a computing device, retrieving a unique identifier of the first USB device, the unique identifier comprising one or both of a USB container ID or a serial number;
using the unique identifier to query a policy that governs connection of USB devices;
determining that the policy indicates that the unique identifier represents a USB device that is not allowed; and
preventing the first USB device from being accessible on the computing device.

20. The method of claim 19, further comprising:
sending a request to a management server for approval to connect the first USB device, the request including the unique identifier.

* * * * *